US006342090B1

(12) United States Patent
Cao

(10) Patent No.: US 6,342,090 B1
(45) Date of Patent: Jan. 29, 2002

(54) GAS GENERATING SYSTEM WITH MULTI-RATE CHARGING FEATURE

(75) Inventor: Tuan Q. Cao, Davenport, IA (US)

(73) Assignee: Litton Systems, Inc., Woodland Hills, CA (US)

(*) Notice: Subject to any disclaimer, the term of this patent is extended or adjusted under 35 U.S.C. 154(b) by 0 days.

(21) Appl. No.: 09/570,514

(22) Filed: May 16, 2000

(51) Int. Cl.[7] ..................... B01D 53/047

(52) U.S. Cl. ..................... 95/23; 95/96; 95/130; 96/110; 96/130; 96/143

(58) Field of Search ..................... 95/23, 96–105, 95/130; 96/110, 115, 130, 143, 144

(56) References Cited

U.S. PATENT DOCUMENTS

| | | | | |
|---|---|---|---|---|
| 3,922,149 A | * 11/1975 | Ruder et al. | 95/130 X |
| 4,428,372 A | * 1/1984 | Beysel et al. | 96/130 X |
| 4,552,571 A | * 11/1985 | Dechene | 96/130 X |
| 4,636,226 A | * 1/1987 | Canfora | 96/130 X |
| 4,673,415 A | * 6/1987 | Stanford | 96/130 X |
| 4,681,602 A | * 7/1987 | Glenn et al. | 95/130 X |
| 4,869,733 A | * 9/1989 | Stanford | 96/130 X |
| 5,354,361 A | 10/1994 | Coffield | 95/103 |
| 5,402,665 A | 4/1995 | Hart et al. | 73/16 |
| 5,858,062 A | 1/1999 | McCulloh et al. | 95/8 |
| 5,988,165 A | 11/1999 | Richey, II et al. | 128/205.12 |

FOREIGN PATENT DOCUMENTS

| | | | | |
|---|---|---|---|---|
| EP | 0537612 A1 | 4/1993 | | |
| EP | 0860646 A2 | 8/1998 | | |
| JP | 03-270709 A | * 12/1991 | 96/110 | |

* cited by examiner

*Primary Examiner*—Robert H. Spitzer
(74) *Attorney, Agent, or Firm*—Lowe Hautpman Gilman & Berner, LLP

(57) ABSTRACT

The present invention is directed to an apparatus for supplying gas at a first pressure and at a second pressure. The apparatus includes a gas generating system having a gas generating system outlet. A flow switch is in communication with the gas generating system outlet and has an outlet thereof forming a gas outlet at the first pressure. A pressure regulator is in communication with the gas generating system outlet for regulating gas flowing to the gas outlet at the first pressure. A solenoid valve is electrically controlled by the flow switch and is in communication with the gas generating system outlet and has a solenoid valve outlet. A pressure intensifier is in communication with the solenoid valve for raising the pressure of the gas generated by the gas generating system for output to an outlet at a second pressure.

21 Claims, 1 Drawing Sheet

GAS GENERATING SYSTEM WITH MULTI-RATE CHARGING FEATURE

FIELD OF THE INVENTION

The present invention relates generally to gas generating systems, and more particularly, to gas generating systems capable of producing a product gas, such as oxygen or nitrogen, at two different pressures.

BACKGROUND OF THE INVENTION

U.S. Pat. No. 5,858,062, incorporated by reference in its entirety into this specification and assigned to the instant assignee discloses an apparatus for providing oxygen-enriched air at a first pressure and at a second pressure with the second pressure being greater than the first pressure. As disclosed in the '062 patent the apparatus includes a pressure swing adsorption system and a pressure intensifier. The pressure swing adsorption system is adapted to provide oxygen-enriched air to a first outlet at the first pressure and to provide oxygen-enriched air to a pressure intensifier at the first pressure. The pressure intensifier pressurizes the oxygen-enriched air and provides the oxygen-enriched air to a second outlet at the second pressure. Disadvantageously, the system disclosed in the '062 patent charges or fills a high pressure vessel at constant rate whether or not there is flow on the low pressure output port. This requires a long period of time to charge a vessel (i.e., 8 hours to charge 240 liters at constant rate of 0.5 liters per minute (1 pm). Thus, a need exists in the art for a system which can simultaneously provide product gas to a high pressure outlet and a low pressure outlet where the high pressure charging rate can be varied depending upon the flow required from the low pressure outlet.

SUMMARY OF THE INVENTION

It is, therefore, an object of the present invention to provide a gas generating system capable of charging a gas cylinder faster than prior art systems.

These and other objects of the present invention are achieved by an apparatus for supplying gas at a first pressure and at a second pressure. The apparatus includes a gas generating system having a gas generating system outlet. A flow switch is in communication with the gas generating system outlet and has an outlet thereof forming a gas outlet at the first pressure. A pressure regulator is in communication with the gas generating system outlet for regulating gas flowing to the gas outlet at the first pressure. A solenoid valve is electrically controlled by the flow switch and is in communication with the gas generating system outlet and has a solenoid valve outlet. A pressure intensifier is in communication with the solenoid valve for raising the pressure of the gas generated by the gas generating system for output to an outlet at a second pressure.

The foregoing and other objects of the present invention are achieved by a method of charging a high pressure reservoir with product gas at a variable rate. The method provides oxygen enriched gas to a low pressure outlet and to a pressure intensifier. A flow rate of oxygen enriched gas is detected flowing to the low pressure outlet. A flow rate to the pressure intensifier is controlled based on the detected flow to the low pressure outlet.

The foregoing and other objects of the present invention are achieved by an apparatus for supplying gas at a first pressure and at a second pressure. The apparatus includes a gas generating system having a gas generating system outlet in communication with a low pressure outlet and a high pressure outlet. A flow switch and detector is in communication with a gas generating system outlet and detects a gas flow rate through to a low pressure. A controller controls gas flow to high pressure based on a signal supplied by a flow switch. A pressure intensifier is in communication with a high pressure outlet for raising the pressure of the gas generated by a gas generating system for output to a high pressure reservoir.

The gas generating system with multi-rate charging feature according to the present invention can easily double and up to quadruple the charging rate as compared to prior art charging systems when there is no flow at the low pressure outlet. This reduces the charging time in half.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

BEST MODE FOR CARRYING OUT THE INVENTION

Figure 1:
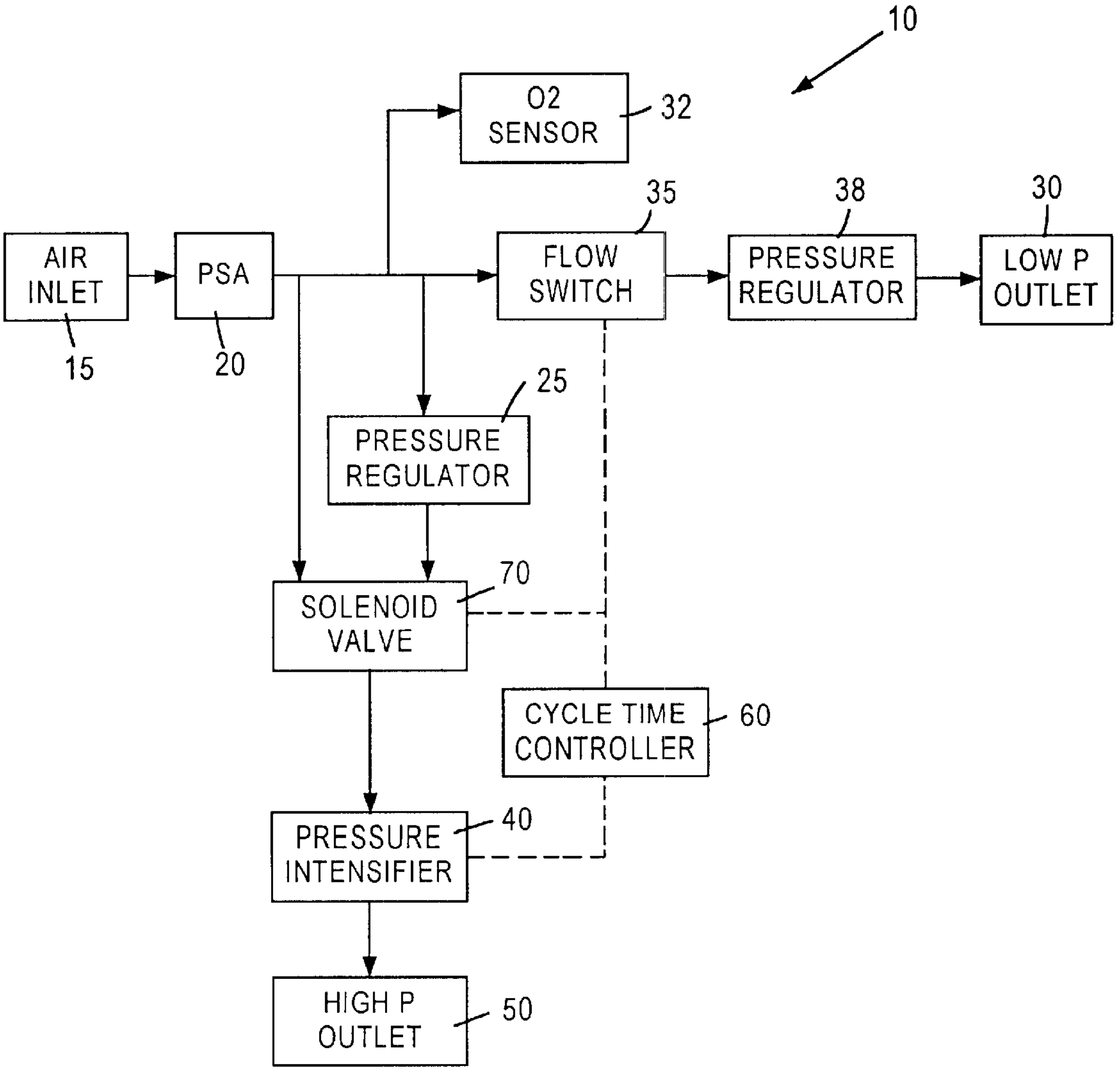
FIG. 1 is a block diagram schematic of gas generating system with a multi-rate charging feature according to the present invention.

FIG. 1 depicts the gas generating system 10 having a multi-rate charging according to the present invention. In FIG. 1, functional blocks with pneumatic connections are shown in solid lines with arrows and control signals shown in dashed lines. A pressure swing adsorption (PSA) system 20 is the gas generating part of the system 10. The present invention preferably uses a PSA system instead of other gas generating systems. However, the concept will work with any other type of gas generating systems (solid state, selective filtering, electrolysis, etc.). Air is provided to the PSA system 20 through an air inlet 15. Gas generated by the PSA system 20 is regulated by a pressure regulator 38 and made available at a low pressure outlet 30. To detect low pressure outlet flow, a flow switch 35 is inserted in between the PSA system 20 and the outlet 30. The flow switch 35 is a device that detects flow (above or below a threshold) and outputs a logic signal by means of either mechanical switch contact or solid state switch. One can select normally open or normally closed switch contact (normally high or low logic, depends on controller). The flow switch 35 can be used to drive the solenoid 70 to bypass the pressure regulator 25.

Gas provided by the PSA system 20 to the pressure intensifier 40 can be regulated by the pressure regulator 25. The result is a higher charging rate at the high pressure outlet 50. The flow switch 35 logic signal is also input to the cycle time controller 60 for changing system cycle time. With no flow, the controller 60 can shorten cycle time to increase the charging rate at the high pressure outlet 50. The combination of pressure regulator 25 bypass and shortening cycle time can be used to achieve desired charging rate. Typical low pressure outlet pressure is six (6) psig. The high pressure outlet 50 is normally connected to a storage plenum (vessel) to charge up storage. The maximum pressure at the high pressure outlet 50 is 2000 psig.

A pressure intensifier 40 receives input from the PSA system 20 to generate high pressure available at a high pressure outlet 50. An example of a pneumatically driven pressure swing adsorber system having a pneumatically driven compressor is disclosed in U.S. Pat. No. 5,354,361 which issued Oct. 11, 1994 and is hereby incorporated by reference in its entirety into the instant specification.

Simultaneous flow of 5 liters per minute (LPM) at the low pressure outlet and charging rate of 0.75 LPM (typical for prior art) has been demonstrated. The cycle time is 19 seconds. By varying cycle time or bypassing the pressure regulator 25 when low pressure outlet flow is less than a threshold (i.e., 2.5 LPM), the charging rate can be changed to up to 3 LPM (with cycle time of 11 seconds and 80 psig inlet pressure). The flow rate (charging rate) of the intensifier 40 depends on pressure at the intensifier 40 inlet and operating cycle. The intensifier 40 inlet pressure can be controlled by adding a pressure regulator 25 (previously described) between the PSA system 20 and the intensifier 40.

The operating cycle is controlled by a cycle time controller 60 (normally built-in system controller). For controlling the charging rate, the flow switch 35 can control a solenoid valve 70 to operate the intensifier 40 at full PSA outlet pressure or partial (regulated) PSA 20 output pressure. Besides, the flow switch 35 input can be used to determine cycle time for the intensifier 40 to vary the charging rate. As mentioned above, the flow switch detects a minimum flow then switches an electrical switch or mechanical contact on and off when the flow crosses a threshold.

An $\mathbf{0_2}$ sensor 32 is connected to the main controller (not shown) which controls the charging. If oxygen concentration is below a threshold (i.e., 90%), the cycle controller 60 stops the intensifier 40 from charging to the high pressure outlet 50. An example of oxygen gaseous concentration monitor is disclosed in U.S. Pat. No. 5,402,665 which issued Apr. 4, 1995. A small amount of gas from the PSA 20 output, e.g., typically less than 250 cc per minute, is continuously monitored by the oxygen sensor 32 to ensure that the oxygen purity is above a predetermined value, e.g. 90%. If the purity is below the predetermined or threshold value, a microprocessor can energize a warning light to alert the gas that an equipment malfunction has occurred and to prevent cycling of the pressure intensifier 40. The pressure intensifier 40 may be standard two-stage device with a drive air cylinder and first and second stage product gas cylinders. Other methods and apparatus can be used other than the above description to implement the pressure and cycle time control (using electronic controlled pressure regulator instead of regulator and solenoid valve, etc.).

In embodiments of the present invention, the first pressure is in the range of 0–80 psi and the second pressure is in the range of up to 3000 psi.

The oxygen content of the oxygen-enriched air may be varied over a wide range but is preferably at least 85% by volume. In preferred embodiments, the oxygen content is at least 90% by volume, especially in the range of 92–94% by volume.

The oxygen concentrator described herein utilizes a pressure intensifier 40 to raise the pressure of a portion of the oxygen-enriched air to a suitable pressure, e.g. 2000 psig, for storage in pressure vessels, e.g. a cylinder, for use by ambulatory patients. It will be understood that when the cylinder is empty, the pressure intensifier 40 will provide oxygen-enriched air at a relatively low pressure, for instance, about the pressure in the storage plenum, e.g. 30 psig, but that this pressure will rise as the cylinder fills, e.g. to the aforementioned 2000 psig.

The gas generating system with multi-rate charging feature according to the present invention can easily double and up to quadruple the charging rate as compared to prior art charging systems when there is no flow at the low pressure outlet. This reduces the charging time in half.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A method of charging a high pressure reservoir with product gas at a variable rate, comprising:

providing oxygen enriched gas to a low pressure outlet and to a pressure intensifier;

detecting a flow rate of oxygen enriched gas flowing to the low pressure outlet; and controlling a flow rate to the pressure intensifier based on the detected flow to the low pressure outlet.

2. The method of claim 1, comprising cycle timing the pressure intensifier depending upon the detected flow rate to the low pressure intensifier.

3. The method of claim 1, comprising regulating a pressure of the oxygen enriched gas being provided using a pressure regulator.

4. The method of claim 3, comprising bypassing the pressure regulator to provide oxygen enriched gas to the pressure intensifier.

5. The method of claim 1, the oxygen enriched gas is being provided by an oxygen concentrator.

6. An apparatus for supplying gas at a first pressure and at a second pressure, comprising:

a gas generating system having a gas generating system outlet;

a flow switch in communication with said gas generating system outlet and having an outlet thereof forming a gas outlet at the first pressure;

a pressure regulator in communication with said gas generating system outlet for regulating gas flowing to said gas outlet at the first pressure;

a solenoid valve electrically controlled by said flow switch and in communication with said gas generating system outlet and having a solenoid valve outlet; and a pressure intensifier in communication with said solenoid valve for raising the pressure of the gas generated by said gas generating system for output to an outlet at a second pressure.

7. The apparatus of claim 6, further comprising a cycle timer controller which operates to control the cycle time of the pressure intensifier.

8. The apparatus of claim 7, wherein the length of time of the cycle time is inversely proportional to the length of time that said flow switch is in an open condition.

9. The apparatus of claim 6, wherein said gas generating system is an oxygen concentrator.

10. The apparatus of claim 9, wherein said oxygen concentrator uses pressure swing adsorption (PSA).

11. The apparatus of claim 6, wherein said pressure regulator is adjustable such that the first pressure can be varied.

12. The apparatus of claim 6, wherein said pressure regulator is electronically controlled.

13. The apparatus of claim 6, wherein the second pressure is up to 3000 psi.

14. The apparatus of claim 6, wherein the first pressure is in the range of 0–80 psi.

15. The apparatus of claim 6, wherein the first pressure is approximately 6 psi.

16. An apparatus for supplying gas at a first pressure and at a second pressure, comprising:

a gas generating system having a gas generating system outlet in communication with a low pressure outlet and a high pressure outlet;

a flow switch and detector in communication with said gas generating system outlet and for detecting a gas flow rate through to said low pressure;

a controller for controlling gas flow to high pressure based on a signal supplied by said flow switch; and a pressure intensifier in communication with said high pressure outlet for raising the pressure of the gas generated by said gas generating system for output to a high pressure reservoir.

17. The apparatus of claim 16, further comprising a cycle timer controller which operates to control the cycle time of the pressure intensifier.

18. The apparatus of claim 17, wherein the length of time of the cycle time is inversely proportional to the length of time that said flow switch is in an open condition.

19. The apparatus of claim 16, wherein said gas generating system is an oxygen concentrator.

20. The apparatus of claim 16, further comprising a pressure regulator for controlling the outlet pressure of said gas generating system.

21. The apparatus of claim 16, further comprising a solenoid valve electrically controlled by said flow switch and in communication with said gas generating system outlet and having a solenoid valve outlet.

* * * * *